June 12, 1962 N. MILLERON 3,038,731
VACUUM SEALING MEANS FOR LOW VACUUM PRESSURES
Filed March 14, 1958 2 Sheets-Sheet 1

INVENTOR.
NORMAN MILLERON
BY
Roland A. Anderson
ATTORNEY.

June 12, 1962  N. MILLERON  3,038,731
VACUUM SEALING MEANS FOR LOW VACUUM PRESSURES
Filed March 14, 1958  2 Sheets-Sheet 2

INVENTOR.
NORMAN MILLERON
BY
*Roland A. Anderson*
ATTORNEY.

United States Patent Office 3,038,731
Patented June 12, 1962

3,038,731
VACUUM SEALING MEANS FOR LOW
VACUUM PRESSURES
Norman Milleron, Berkeley, Calif., assignor to the United
States of America as represented by the United States
Atomic Energy Commission
Filed Mar. 14, 1958, Ser. No. 721,615
3 Claims. (Cl. 277—22)

This invention relates in general to vacuum seals and methods for producing same and more specifically to seals affected by the surface tension of a thin layer of liquid metal of low vapor pressure, under critical conditions.

In high vacuum technology such as mass spectroscopy, particle acceleration, controlled thermonuclear reactions and others, various manipulations, motion transmitting and closure operations must be performed in vacuum pressures in the region lower than $10^{-6}$ mm. Hg. Existing vacuum technology, however, provides only partially satisfactory equipment for attaining and maintaining such reduced pressures. High vacuum valves and movement transmitting seals are generally dependent upon organic sealants and lubricants, all of which generally have vapor pressures precluding their use at pressures in the region of $10^{-6}$ mm. Hg, particularly at the elevated temperatures necessary for degassing of chamber walls. With large closures, e.g., in tanks housing particle accelerators, it is frequently necessary to employ surface-to-surface deformation fits, sometimes using a machined deformable copper gasket. Inordinately large closing forces are necessary and the surfaces and gasket materials cannot be re-used after deformation. Entirely satisfactory seals have heretofore been obtained only by permanent and semi-permanent joining methods, such as welding, hard soldering, wetting with glass, etc., where there is sealing contact between materials on a truly molecular scale.

It has been discovered that certain liquid metals, and especially certain alloys, formed of metals having vapor pressures of below about $10^{-8}$ mm. Hg at about 350° C. to 500° C. and above, and melting points below 100° C. may be used to seal closures or other closely fitted surfaces in vacuums of $10^{-8}$ mm. Hg or lower and at temperatures at least as high as 500° C. This is accomplished by utilizing the surface tension forces of the sealant metal which is applied in such a manner that true molecular wetting of the specified closure surfaces is achieved. The surfaces to be sealed must be disposed in proximity with opposing faces being spaced within a maximum distance which distance is of the order of one-thousandth of a centimeter for atmospheric pressure differences and correspondingly larger for lower pressure differentials. Alloy mixtures of gallium, indium and tin yield best results and therefore are preferred. In addition to gallium, indium and tin only lead and bismuth have been found to possess the requisite properties for formulating such sealants, especially in alloy form, and gallium must generally be present to produce best results. All metal and siliceous materials of construction are in general wet by these sealants. Exceptional wetting may be obtained with surfaces formed of the metals stainless steel, brass, copper, nickel, molybdenum, tantalum, and tungsten and with the siliceous materials, glass, including Pyrex, quartz, and synthetic mica, all of which materials are frequently used as materials of construction for high vacuum systems wherein high temperatures may be employed. Accordingly, these sealants and structural materials may be employed in the construction of many different types of sealed closures as well as in other sealed mechanism as hereinafter described. The invention is easily adaptable to any vacuum closure and to the sealing of valves and translatable or rotary devices where the moderate tolerances herein specified are provided. Both heat and electricity can be conducted through the seals and lubrication of contacting parts is also provided by the sealants.

Accordingly, an object of the invention is to provide a means of effecting vacuum seals.

Another object of the invention is to provide vacuum seals between two surfaces over pressure differentials as great as $10^{-8}$ mm. Hg and at temperatures up to at least as high as 500° C.

Still another object of the invention is to provide a method of sealing gaps between stationary or movable surfaces with liquid metal sealants held in position therebetween by wetting and surface tension.

A further object of the invention is to employ metal alloy sealants having melting points below 100° C., low vapor pressures and high surface tension in sealing gaps between stationary or movable surfaces of a vacuum system.

A still further object of the invention is to provide apparatus for use in vacuum systems in which a liquid metal sealant is used to effect the vacuum seal.

Other objects and advantages will become apparent by consideration of the following description and accompanying drawing of which:

Figure 1:
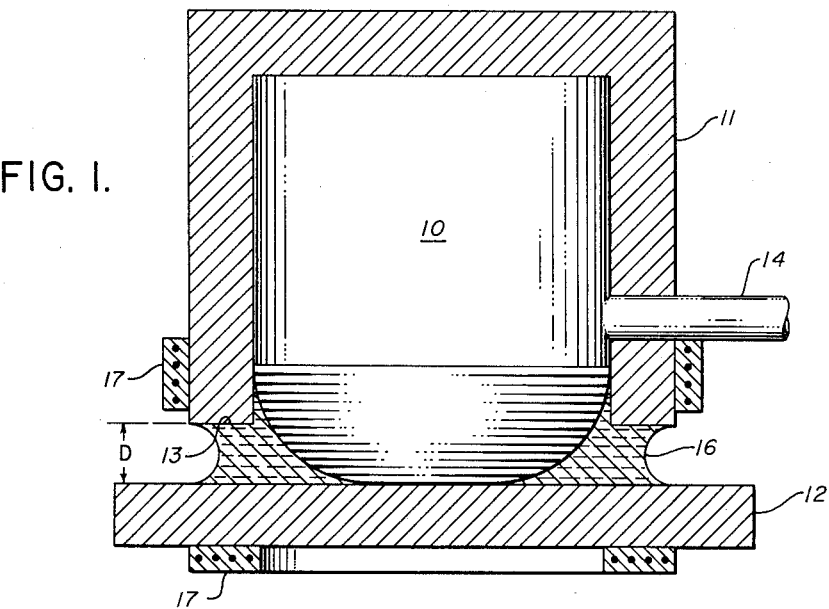
FIGURE 1 is a vertical cross-sectional view of an evacuated chamber having a closure sealed with a liquid metal.

The surfaces to be vacuum sealed in accordance with the invention are constructed from the class of materials specified hereinafter and arranged in contiguity in the various types of apparatus joints contemplated herein. Moreover, characteristically, in specific embodiments, at least one side of the sealed joint will be exposed to a high vacuum and at least intermittent elevated temperature conditions. In other instances a pressure differential ranging upwards to at least atmospheric pressure will exist across the sealed joint. Generally speaking, such jointed apparatus is sealed by disposing certain liquid or molten metals between said contiguous surfaces as a sealant.

As an initial operation in producing the seal any grease or other gross impurity is removed from the seal surfaces, e.g., with an organic solvent, and the general seal areas are separately delineated. The extent of the seal areas to be wetted determines the amount of metal applied on the opposing surfaces in order to obtain a film of the desired thickness. Conventional methods may be employed to effect such wetting; however, ultrasonic soldering or wetting techniques are preferred since extraneous material is not added. In using the ultrasonic method, the metal surface is usually disposed horizontally and the sealant metal in a solid or liquid form is applied to the delineated surface of the joint, which is heated to a temperature above the melting point of the sealant metal, and wetting is accomplished by applying ultrasonic energy. Other techniques, e.g., dipping may be used. Certain of the liquid metals will be found to readily wet the joint surface, requiring no further treatment. The amount of metal applied is that required which on mating the joint surface occupies the space therebetween at least along a line around the area of contact or as a band across the gap area of the joint and normal to the direction of the pressure which will exist when the seal is placed in use. The joint is, of-course established while the sealant metal is still liquid, i.e., molten. More particularly, the opposing joint surfaces are brought into contiguity in any way consistent with the shape of the surfaces so that matching wetted parts contact each other. The two films merge without additional closing force other than that necessary to bring the surfaces within the aforementioned clearance, generally one-thousandth of a centimeter where atmospheric pressure is to be retained. With proper design and workmanship closure and sealing may be most conveniently effected merely by application of a vacuum pressure differential. Once the seal is effected the temperature of the liquid metal may be allowed to fall below the metal melting point without loss of the seal integrity. However, in order to obtain extremely low pressures, i.e., below $10^{-6}$ mm. Hg, in the system, bake out at a higher temperature is necessary in accordance with conventional vacuum practice.

More specifically, molten sealant metals gallium, indium, tin, bismuth, lead, and alloy combinations thereof, examples of which are shown in Table 1, have been found satisfatcory in practice to wetting and sealing surfaces formed of stainless steel, brass, copper, nickel, molybdenum, tantalum, tungsten, and siliceous materials, particularly glass, (including Pyrex) quartz and synthetic mica as indicated in Table II. Due to the diverse nature of such materials other materials of construction should prove to behave similarly. The indicated materials may be used to construct sealed joints capable of withstanding vacuum pressures of at least $10^{-8}$ mm. Hg at 350° to 500° C. and above in all instances, except for the temperature exceptions noted immediately hereinafter, and as low as $10^{-10}$ mm. Hg in the case of molybdenum and a few of the other metals. Generally speaking, the metals tantalum, tungsten and molybdenum do not undergo undesirable chemical reactions or loss of the sealant as by diffusion into the surface below temperatures of about 500° C. in vacuo. The non-metals de-wet at 300° C. and stainless steel cannot be used above 250° C. Brass, Cu and Ni form alloys at appreciable rates above room temperatures. Gallium is stable to at least 150° C. in air and the remainder are stable to at least 250° C. in air. The metals lead and bismuth have vapor pressures somewhat higher than $10^{-8}$ mm. Hg above 350° C.

The lower melting alloys containing gallium and approximating eutectic mixtures are obviously most desirable since they are liquids at usual ambient temperatures. The gallium, indium, tin ternary eutectic melts at about 10.7° C.; however, such alloys have a strong tendency to supercool and they are therefore found to remain liquid to lower temperatures in practice. The liquid metals or alloys which melt below 100° C. are more conveniently employed and those which melt below about 60° C. and especially those approximating eutectics, i.e., having melting points within about 15° C. of the eutectic temperature, are preferred. Gallium and the somewhat higher melting alloys are liquids at temperatures occurring in many operating vacuum systems so that auxiliary heating is not required. However, in rigorous outgassing procedures carried out at high temperatures all of the indicated materials are liquid and provide effective sealing when applied in accordance with the invention.

TABLE I

| Metal alloy, percent) Wt. | Melting point, ° C. | Vapor pressure | | Surface tension | |
|---|---|---|---|---|---|
| | | mm. Hg | ° C. | dynes/cm. | ° C. |
| Gallium | 29.9 | 10⁻⁸ | 500 | 735 to 340 | 40 |
| Indium | 156.4 | 10⁻⁸ | 500 | 340 | 250 |
| Tin | 231.9 | 10⁻⁸ | 500 | 526 / 510 | 300 / 500 |
| Bismuth | 271.0 | 10⁻⁸ | 300 | 376 / 363 | 300 / 500 |
| Lead | 327.4 | 10⁻⁸ | 350 | 442 / 431 | 350 / 500 |
| 62.5 Ga, 21.5 In, 16 Sn | 10.7 | 10⁻⁸ | 500 | 500 | 500 |
| 62 Ga, 25 In, 13 Sn | ~5 | | | | |
| 69.8 Ga, 17.6 In, 12.5 Sn | 10.8 | | | | |
| 76 Ga, 24 In | 15.7 | | | | |
| 92 Ga, 8 Sn | ~20 | | | | |
| ~70 Ga, ~30 Sn | ~60 | | | | |
| 49 Bi, 18 Pb, 12 Sn and 21 In | 57.8 | | | | |
| 49 Bi, 18 Pb, 15 Sn and 18 In | 57.8–69 | | | | |
| 32.7 Bi, 7.5 Pb, 16.7 Sn, and 43.1 In | 58.8 | | | | |
| 49.5 Bi, 17.6 Pb, 11.6 Sn and 21.3 In | 58.2 | | | | |

TABLE II

| Sealants (numbers refer to Wt. percent) | Materials of Construction |
|---|---|
| Gallium | Copper, brass, stainless steel, nickel, molybdenum, tantalum, tungsten, glass, quartz, Pyrex and synthetic mica. |
| Indium | Molybdenum, tantalum, glass, Pyrex and quartz. |
| Tin | |
| 62.5 Ga, 21.5 In, 16 Sn | Copper, brass, stainless steel, nickel, molybdenum, tantalum, tungsten, glass, quartz, Pyrex, synthetic mica. |
| 62 Ga, 25 In, 13 Sn | |
| 69.8 Ga, 17.6 In, 12.5 Sn | |
| 76 Ga, 24 In | |
| 92 Ga, 8 Sn | |
| Approx. 70 Ga, Approx. 30 Sn | |
| 49 Bi, 18 Pb, 12 Sn, 21 In | |
| 49 Bi, 18 Pb, 15 Sn, 18 In | Brass, copper, stainless steel and nickel. |
| 32.7 Bi, 7.5 Pb, 16.7 Sn, 32.1 In | |
| 49.5 Bi, 17.6 Pb, 11.6 Sn, 21.3 In | |

General principles and basic considerations relevant to the construction and operation of liquid metal sealed vacuum apparatus in accordance with the invention will now be set forth with reference to FIGURE 1 of the drawing as illustrated therein. A vacuum chamber 10 including a housing 11 having an open end closed with an overlapping cover plate 12 is disposed contiguously in near contact position with the planar edge surface 13 of the side walls of the housing 11 constructed of materials specified above. Vacuum conduit 14 couples chamber 10 to a vacuum pump (not shown) capable of evacuating the chamber to a very high vacuum level. A liquid sealant metal or alloy of the character described is disposed in wetted adherent relation between the edge 13 of the housing 11 and corresponding surface of the cover plate as a continuous ribbon 16. When a sealant metal is employed which is solid at the ambient temperature electrical resistance heaters 17 may be attached to the chamber walls and cover plate to maintain the temperature at a level at which the metal is liquid, when required. In utilizing apparatus sealed in accordance with the invention other heating means including ovens, radiant heat, induction heating, etc., may also be employed.

Upon application of the vacuum with the temperature maintained above the melting point, the liquid metal sealant 16 is distended inwards as indicated in FIGURE 1. The exact distance to which the surfaces may be separated without disrupting the liquid metal surface tension seal may be calculated by considering the mathematical relationships governing the behavior of the liquid metal supported by surface tension and wetting the gap (D) between housing edge and cover plate surfaces as shown in FIGURE 1. Complete wetting of the surfaces implies zero contact angle between the solid and liquid surfaces, which merely means that the adhesion between the solid and liquid is greater than the cohesion in the liquid. Then, with a vacuum pressure differential applied across the liquid, the liquid is subjected to a force directed inwardly toward the lower pressure side. However, for small gaps continuously and adequately wetted by liquids with sufficiently high surface tension, the surface tension effectively resists absorption and passage of the gas. The mathematical expression which relates the maximum pressure difference which can be withstood across a curved liquid surface to the relevant physical properties is as follows:

$$(P_1 - P_2) = \gamma \left( \frac{1}{R_1} - \frac{1}{R_2} \right)$$

where $P_1$ is atmospheric pressure in the limiting case.
$P_2$ is vacuum pressure.
$\gamma$ is the coefficient of surface tension of the sealant.
$R_1$ is the radius of curvature of the sealant on the pressurized side.
$R_2$ is the radius of curvature taken orthogonally to $R_1$, and corresponds to the curvature of the ribbon of metal along the wetted surface.

In usual practice the most extreme situation exists where $P_1$ is atmospheric pressure since with lower pressure differentials less disrupting force is present. For all practical situations $P_2$ is negligible and $R_1$ is a great deal less than $R_2$, so that the above expression simplifies to: $P_1 \cong \gamma/R_1$. The limiting distance, D, between the seal surfaces is the quantity $2R_1$, wherefore the distance D, the absolute distension pressure $P_1$, and the coefficient of surface tension $\gamma$ are directly inter-related as indicated by the equations. Illustratively for a sealant metal with a surface tension of 500 dynes/cm. in instances where the atmospheric pressure is ~$10^6$ dynes/cm.$^2$, the limiting distance, D, to which the surfaces may be separated is limited to a maximum of about one-thousandth of a centimeter. While exact distances may be calculated for each metal of a different surface tension, the aforementioned distance of one-thousandth of a centimeter may be used as a practical working limit for atmospheric pressure differential and with the vacuum pressures and temperatures normally encountered, i.e., $10^{-8}$ mm. Hg at 500° C., as in outgassing operations, etc. With lower pressure differentials and lower temperatures correlatively larger gap tolerances are permitted.

Figure 2:
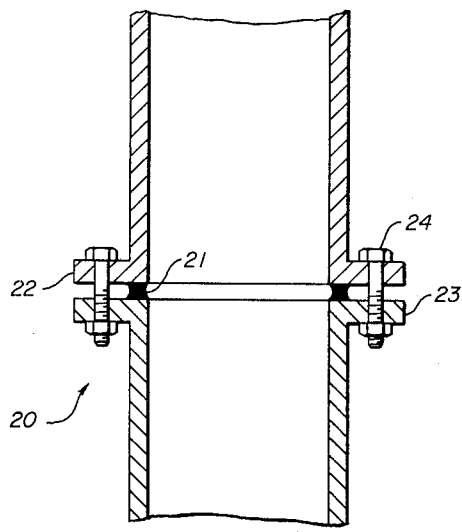
FIGURE 2 is a vertical cross-sectional view of a flanged joint having machined flange surfaces which are sealed with a liquid metal.

Application of the foregoing principles in the sealing of compression fitted flanged joint 20 shown in FIGURE 2 is effected by disposing a liquid metal sealant 21 to wet continuous circumferential portions of the abutting surfaces of flanges 22 and 23 of the joint, whereby the liquid metal is supported by surface tension therebetween. In ordinary vacuum practice such surfaces must be carefully machined to as close a tolerance as possible and thereafter closed as by flange bolts 24 or other closing means to a deformation fit in order to achieve reasonable vacuum integrity. In extreme cases such joints cannot be used more than once because of deformation. However, utilization of the liquid metal sealant eliminates the need for both close machining and deformation fitting.

Figure 3:
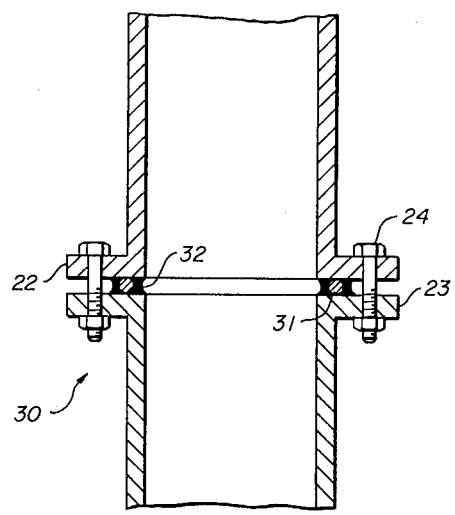
FIGURE 3 is a vertical cross-sectional view of a flanged joint in which opposing flange surfaces are sealed with a deformed metal compression gasket employed in conjunction with a liquid metal.

Modification of the foregoing flanged joint 20 to include a deformable copper or other metal gasket 31 interposed between the flanges 22 and 23 yields flanged joint 30 shown in FIGURE 3. In order to preserve the flange surfaces at the expense of the deformable gasket and to obtain higher vacuums a liquid metal sealant 32 is disposed so as to wet gasket 31 as well as adjacent surfaces 22 and 23.

Figure 4:
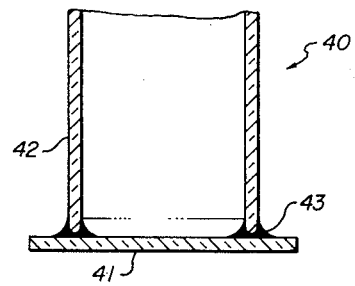
FIGURE 4 is a vertical cross-sectional view of a glass window retained at the end of an evacuated machined metal tube by atmospheric air pressure and sealed thereto with a liquid metal.

In FIGURE 4 there is illustrated an assembly 40 wherein a glass disc 41 employed as a closure for tubular conduit 42 also made of glass or another of the indicated construction materials is sealed by application of a liquid metal sealant 43 between contact surfaces. No closure pressure other than the pressure differential which exists on evacuation is necessary even in a vertical position. The glass must ordinarily be polished or lightly fire polished before proper wetting can be achieved, as by ultrasonic methods.

Figure 5:
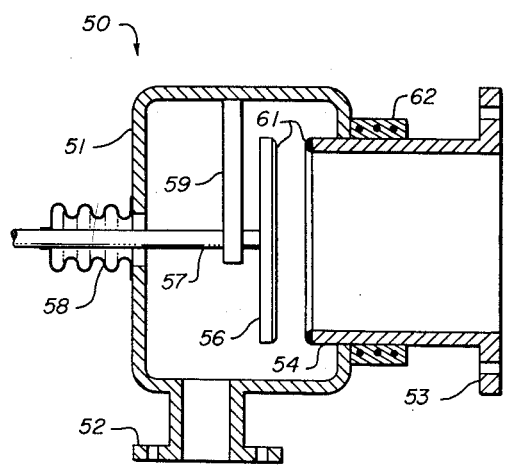
FIGURE 5 is a vertical cross-sectional view of a remotely controlled vacuum valve having a closure sealed with a liquid metal.

A liquid metal sealed vacuum valve 50 is shown in FIGURE 5, wherein there is provided a generally cylindrical valve body 51 provided with lower and side flanged couplings 52 and 53, respectively. Interiorly, the valve body 51 is provided with a circumferential shoulder 54 which serves as a valve seat and is enlarged inwardly of said seat to accommodate a closure disc 56 which is arranged to provide horizontal movement and seating contact against said shoulder 54. More particularly, the disc 56 is supported by a push rod 57 attached to the side wall thereof and extending outwardly through a perforation in the side wall portion of body 51 in a vacuum tight arrangement provided by Sylphon bellows 58 attached to the rod 57 and exterior of the body 51. A bracket 59 slidably engaging the pushrod 57 and attached to the interior of body 51 allows horizontal movement of the disc 56 on actuation of external portions of the pushrod 57 and guides the disc into accurately seating contact with shoulder 54. A liquid metal sealant 61 is applied to the areas of contact between the disc 56 and shoulder 54. Heating means in the form of an electrical resistance heating element 62 attached to exterior surfaces of body 51 may be employed to provide heat by conduction to maintain the sealant metal in liquid condition during use.

Figure 6:
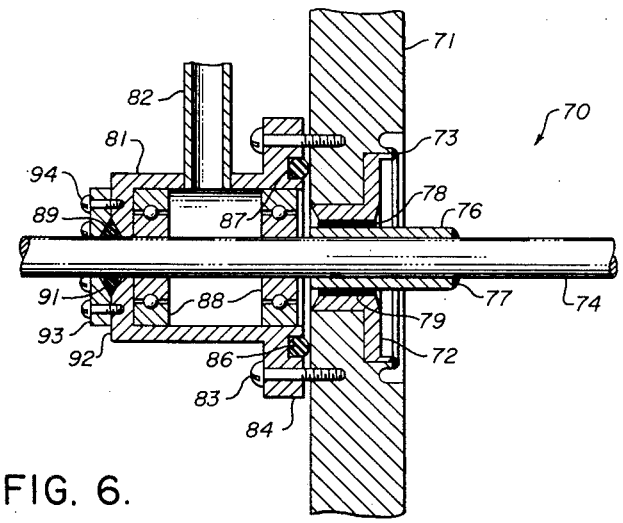
FIGURE 6 is a vertical cross-sectional view of a rotatable shaft sealed with a liquid metal.

A rotatable shaft seal arrangement 70 employing a liquid metal sealant is illustrated in FIGURE 6 of the drawing as constructed in a fragmentary wall portion 71 of a typical high vacuum system (not shown). The wall 71 may be made of usual materials such as carbon steel or the like for economy; however, to meet the requirements of the invention a preferred material such as stainless steel or molybdenum or tantalum for high vacuum high temperature bakeout (outgassing) is required. Accordingly, an enlarged perforation is provided in wall 71 and a flanged journal 72 formed of a preferred metal is fitted and secured therein as by heliarc welding of the peripheral rim 73 of the journal flange to adjacent inner surfaces of the body 71. A rotatable shaft 74, provided with a bearing collar of bushing 76 of one of said preferred metals secured in vacuum-tight relation thereon as by heli-arc welding of the inner edge 77 to the shaft is disposed in the journal 72, to extend from an actuated device within the system (not shown) outwardly from wall 71. A liquid metal sealant 78, of the character described, is disposed between the bearing bushing 76 and bearing surface 79 of the journal 72.

In the event that the sealed shaft is to be employed as hereinbefore described a close tolerance is required to withstand disruptiton of the sealant by an atmospheric air pressure gradient as indicated above. However, such close tolerance requirement can be avoided by providing a greater clearance, e.g., 0.005 in. between the bushing and journal maintained by supported alignment of the shaft. This larger tolerance is made possible by application of a gross vacuum to the outer portion of the sealed area.

More particularly, a cylindrically chambered cap 81, evacuated to less than 10 mm. Hg through conduit 82, may be secured to the wall 71 by machine screws 83 with the flanged portion 84 sealed in vacuum-tight relation by means of O-ring 86 disposed in groove 87. Ball bearings 88 disposed in spaced relation within the chambered portion of cap 81 engage the shaft 74 to provide the above-indicated support and alignment. Outwardly projecting portions of the shaft 74 are sealed by an O-ring 89 disposed in the chambered portion 91 of a perforation provided centrally in the end wall 92 and retained therein by a collar 93 secured by machine screws 94.

The rotatable shaft seal 70 may be modified to provide rectilinear motion of shaft 74 by disposing sealant along an extended length of the shaft and substituting rectilinear motion bearings for ball bearings 88. Heating means may be provided as described above.

The further details of the construction and operation of vacuum apparatus provided with seals in accordance with the invention will become apparent in the following examples.

*Example I*

The ends of rigid cylindrical tubes of ¾ in. diameter closed with rigid discs of 1 in. diameter were sealed with liquid Ga-In-Sn alloy sealant. Stainless steel, quartz and Pyrex were used in all possible combinations of tubes and discs. Tight seals were achieved by insuring that contact surfaces were within $10^{-3}$ cm. gap tolerance, were lightly fire-polished (in the case of glass) and were completely wetted by the sealant alloy applied by means of a standard ultrasonic soldering technique. Pressures as low as $10^{-8}$ mm. Hg were then maintained as measured by a helium leak detector. Temperature cycles as high as 250° C. were also employed without failure.

*Example II*

After plastically deforming 0.008 inch thick stainless steel sheets in a shallow dish by means of a simple rubber die, they were sealed into a 3 inch diameter stainless steel tube with molten 50-50 Pb-Sn solder after proper wetting of tube and disc. The dish-shape was necessary to avoid the wrinkle mode of deformation due to expansion while the joint was being heated to the melting point of the solder. Temperatures as high as 350° C. and pressures as low as $10^{-8}$ mm. Hg were employed without detection of a leak with a helium leak detector.

*Example III*

A rotatable shaft of the type shown in FIGURE 6 was constructed using stainless steel as the journal and shaft bushing material. Care was taken to avoid contact between the cladding and the bearing. During a 72 hour test run at a temperature above the liquid metal melting point a differential pressure of 10 mm. helium was maintained across the seal using liquid Ga, In, Sn eutectic alloy as sealant. No leak was detected. The difference in diameters between the shaft and the "bearing" between which the metal seal was located was 0.010 inch. The shaft was used to operate a roller which fed wire off a spool into a vaporization device inside the vacuum shell by cooperating with a second shaft operating with a similar seal. Continuous positive motion, both forward and backward, was effected. Speeds were usually less than 10 r.p.m.

*Example IV*

The following experiment was devised to test various materials of construction and sealants named in Table II. The list was not intended to be all inclusive, but rather to determine whether the materials tested could be used in high vacuum work. All of the materials of construction except glass, Pyrex and quartz were prepared in the form of pairs of flanged joints the mating faces of which were flat within 0.0001 inch. Glass, quartz and Pyrex were also prepared as ground joints fitting to within 0.0001 inch tolerance. Various sealant metals, and combinations thereof, as specified in Table II, were applied to each of the surfaces and wetted as described hereinbefore. The flanged surfaces were bolted down to within the tolerance required for each of the metal sealants used, separate trials being run both with and without deformable wetted metal gaskets constructed of materials similar to each particular joint. Vacuum pressures at least as low as $10^{-7}$ mm. Hg, and in some cases as low as $10^{-10}$, were created on the interior of each pair of flanged joints. Leak tests were made with a standard helium leak detector. Temperature cycles were run successfully as high as at least 500° C., except in the case of stainless steel, where failure occurred at 250° C., and in the case of brass, copper and nickel, which were used only at room temperature, and in the case of the non-metals where non-wetting occurred at about 300° C. Uniformly good results were obtained.

While the invention has been disclosed with respect to several preferred embodiments, it will be apparent to those skilled in the art that numerous variations and modifications may be made within the spirit and scope of the invention and thus it is not intended to limit the invention except as defined in the following claims.

What is claimed is:

1. High vacuum apparatus including in combination mating contiguous surfaces composed of materials selected from the group consisting of copper, brass, stainless steel, nickel, molybdenum, tungsten, tantalum, glass, quartz and synthetic mica disposed to expose the area of contiguity to a vacuum pressure differential across a distance, D, means for retaining said surfaces in said contiguous relation and a liquid metal sealant selected from the group consisting of the alloys of gallium and tin, the alloys of bismuth, lead, tin and indium, the alloys of gallium, indium and tin and the alloys of gallium and indium wetting said contiguous surfaces and being suspended therebetween, said distance D being not greater than indicated by the expression $2\gamma/P_1$, where $\gamma$ is the coefficient of the surface tension of the metal sealant selected in dynes/cm. and $P_1$ is atmospheric pressure, in dynes/cm.$^2$ whereby vacuum pressures at least as low as $10^{-8}$ mm. Hg at 250° C. may be maintained.

2. High vacuum apparatus including in combination mating contiguous surfaces composed of materials selected from the group consisting of copper, brass, stainless steel, nickel, molybdenum, tungsten, tantalum, glass, quartz and synthetic mica disposed to expose the area of contiguity to a vacuum pressure differential across a distance, D, means for retaining said surfaces in said contiguous relation, means for heating said surfaces to a temperature at least above about 250° C., and a liquid metal sealant consisting of an alloy of gallium, indium and tin having a melting point below about 25° C. wetting said contiguous surfaces and suspended therebetween, said distance D not being greater than indicated by the expression $2\gamma/P_1$, where $\gamma$ is the coefficient of the surface tension of the metal sealant selected in dynes/cm. and $P_1$ is atmospheric pressure, in dynes/cm.$^2$ whereby vacuum pressures at least as low as $10^{-8}$ mm. Hg may be maintained.

3. High vacuum apparatus including in combination mating contiguous surfaces composed of molybdenum disposed to expose the area of contiguity to a vacuum pressure differential across a distance, D, means for retaining said surfaces in said contiguous relation, means for heating said surfaces to a temperature higher than at least about 250° C., and a liquid metal sealant consisting of 62.5 weight percent gallium, 21.5 weight percent indium and 16 percent tin wetting said contiguous surfaces and being suspended therebetween, said distance D not being greater than indicated by the expression $2\gamma/P_1$, where $\gamma$ is the coefficient of the surface tension of the metal sealant selected in dynes/cm. and $P_1$ is atmospheric pressure, in dynes/cm.$^2$.

(References on following page)

References Cited in the file of this patent

UNITED STATES PATENTS

| | | |
|---|---|---|
| 432,318 | Mathews | July 15, 1890 |
| 580,058 | Rockwood | Apr. 6, 1897 |
| 897,189 | Belluzzo | Oct. 18, 1908 |
| 1,051,845 | Rich | Jan. 28, 1913 |
| 1,138,284 | Faber | May 4, 1915 |
| 2,133,879 | Thearle | Oct. 18, 1938 |
| 2,246,600 | Putnam et al. | June 24, 1941 |
| 2,384,672 | Glesson | Sept. 11, 1945 |
| 2,429,481 | Mohr et al. | Oct. 21, 1947 |
| 2,533,868 | Anderson | Dec. 12, 1950 |
| 2,594,924 | Carlson et al. | May 6, 1952 |
| 2,649,369 | Smith et al. | Aug. 18, 1953 |
| 2,649,370 | South et al. | Aug. 18, 1953 |
| 2,743,048 | Leck et al. | Apr. 24, 1956 |
| 2,753,098 | Kidner | July 3, 1956 |
| 2,771,900 | Dayton | Nov. 27, 1956 |